F. H. MASON & T. B. GRIFFIN.
SEPARATING APPARATUS.
APPLICATION FILED JAN. 24, 1911.
1,005,255.
Patented Oct. 10, 1911.
2 SHEETS—SHEET 1.
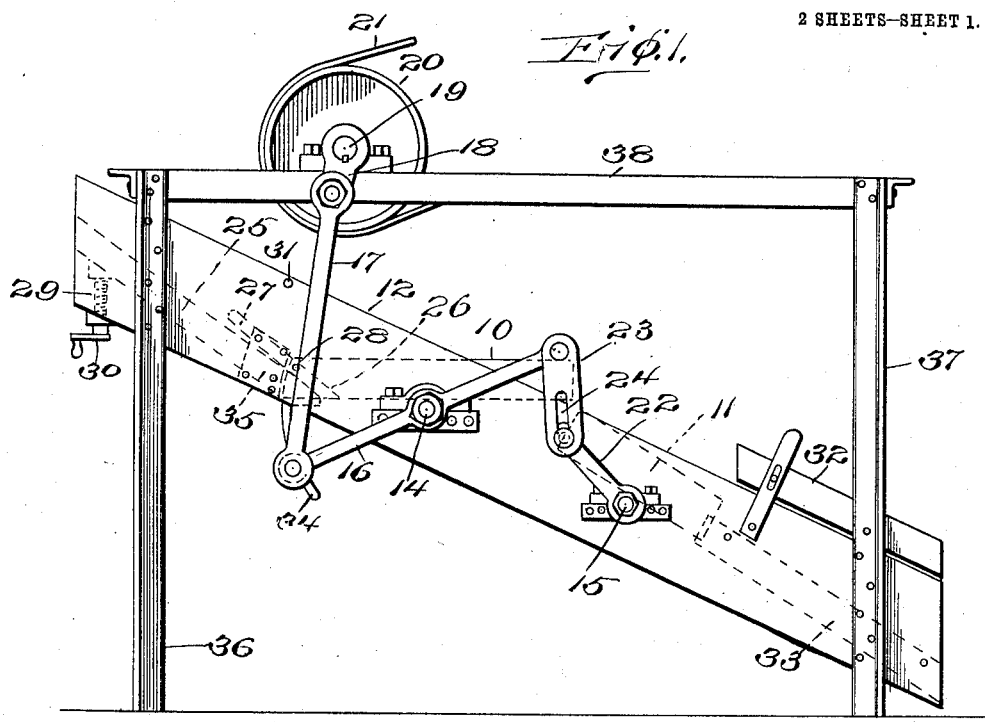
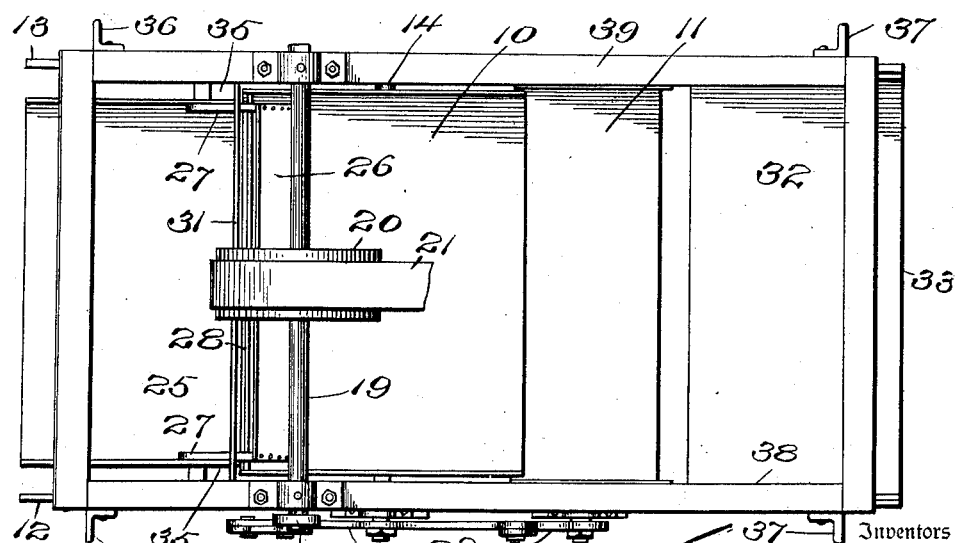
Witnesses
J. M. Fowler Jr.
L. L. Morrell
Inventors
Fred H. Mason
and Thomas B. Griffin,
By Mason Fenwick & Lawrence,
Attorneys F. H. MASON & T. B. GRIFFIN.
SEPARATING APPARATUS.
APPLICATION FILED JAN. 24, 1911.
1,005,255.
Patented Oct. 10, 1911.
2 SHEETS—SHEET 2.
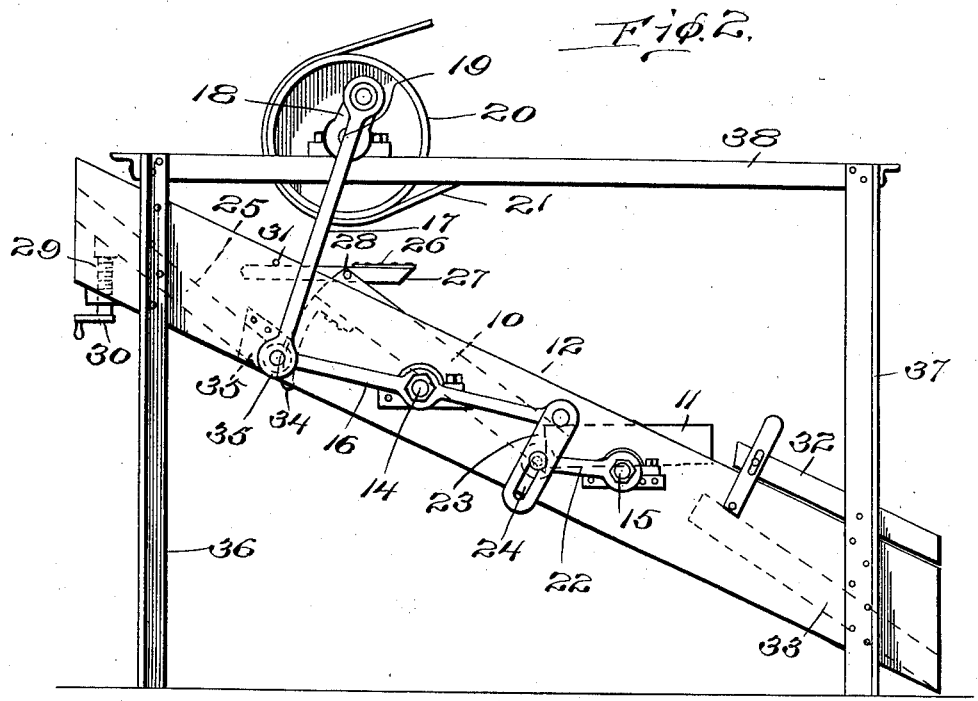
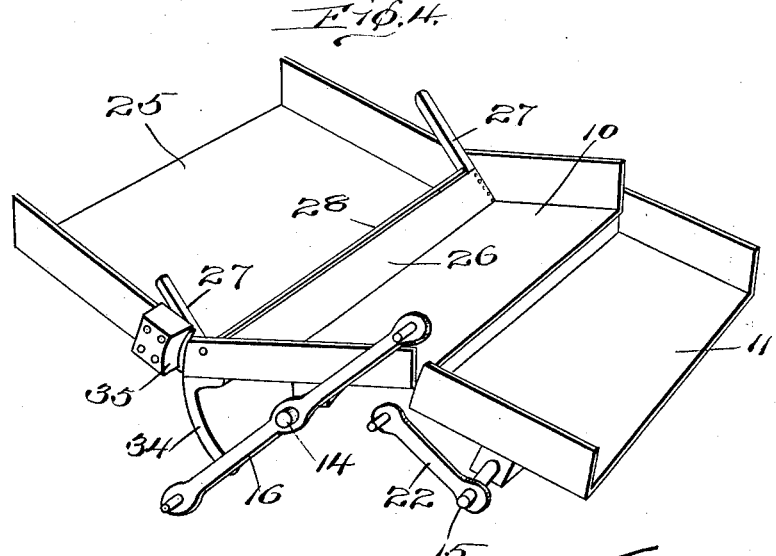

UNITED STATES PATENT OFFICE.

FRED H. MASON AND THOMAS B. GRIFFIN, OF SCRANTON, PENNSYLVANIA.

SEPARATING APPARATUS.

1,005,255.     Specification of Letters Patent.     Patented Oct. 10, 1911.

Application filed January 24, 1911. Serial No. 604,417.

*To all whom it may concern:*

Be it known that we, FRED H. MASON and THOMAS B. GRIFFIN, citizens of the United States, residing at Scranton, in the county of Lackawanna and State of Pennsylvania, have invented certain new and useful Improvements in Separating Apparatus; and we do hereby declare the following to be a full, clear, and exact description of the invention, such as will enable others skilled in the art to which it appertains to make and use the same.

This invention relates to separating apparatus and while especially designed for separating coal from slate, rock, bone and other extraneous matter it is not limited to such use and is capable of employment in the separating of any material having different specific gravity and different degrees of frictional resistance.

An object of the invention is to provide means for discharging predetermined quantities of the material to be acted upon at predetermined intervals so that an accurate supply can always be maintained and the apparatus not clogged to detract from its usefulness.

A further object of the invention is to provide means embodying a tilting pan across which some of the material as coal will be discharged into a chute but to retain such material as slate thereon to be discharged into another receptacle or chute.

A further object of the invention is to provide a pan across which the material acted upon is discharged which said pan is maintained substantially in a horizontal position with a space intervening between such pan and the chute through which certain material as slate will drop while other material as coal will jump the space as is ordinarily done in such gravity separators but with means for discharging the material retained upon the pan after the other material has passed.

A further object of the invention is to provide a series of tilting pans one or more of which shall receive a load of material to be separated and later be tilted to a position to impart momentum to such material and discharge it upon a substantially horizontal pan constructed of material to resist passage of some material but to admit the passage of other material.

A further object of the invention is to provide improved operating means for the several pans and other apparatus employed in carrying out the functions.

With these and other objects in view the invention comprises certain novel constructions combinations and arrangement of parts as will be hereinafter more fully described and claimed.

In the drawings: Figure 1 is a view of the separating device in side elevation with the parts positioned to receive a load of material to be separated from a stationary chute. Fig. 2 is a similar view in side elevation with the parts disposed to discharge material from the receiving pan and in separating position. Fig. 3 is a top plan view of the apparatus. Fig. 4 is a perspective view of the pans disposed in a load receiving position.

Like characters of reference designate corresponding parts throughout the several views.

Two pans 10 and 11 are pivoted between the side members 12 and 13 and comprise substantially plain bottoms with upturned flanges at the opposite ends. The pans 10 and 11 are respectively pivoted upon shafts 14 and 15 to tilt as indicated at Figs. 1 and 2. To control such tilting the shaft 14 is provided with a walking-beam 16 controlled by a pitman rod 17 which is actuated from a crank 18 carried by a shaft 19 receiving power from any approved source as the pulley 20 and belt 21. The walking-beam 16 is rigid with the shaft 14 and as such walking-beam is oscillated the pan is tilted as indicated. The shaft 15 is provided with a crank arm 22 connected with the walking-beam 16 by means of a link 23 which is provided with a slot 24 which permits a limited movement of the walking-beam 16 without actuating the arm 22 and pan 11.

Chute 25 is provided for discharging into the pan 10 and to hold a limited quantity of such discharge for a predetermined time a check plate 26 is carried by means of arms 27 pivoted by means of a rod 28 upon the upturned end flanges of the pan 10 to produce a pocket at the upper or receiving end of such pan into which the chute 25 discharges. The chute 25 may be tilted to control its angularity by means of a screw 29 and crank 30 while the check plate 26 is raised from contact with the pan 10 by the arms 27 engaging the rod 31 extending transversely across the device between the side members 12 and 13. The rod 31 is so positioned that the check plate 26 is not raised to discharge the material retained thereby until the pan 10 has been tilted to a considerable degree of inclination.

The relation and connection between the pans 10 and 11 is such that the check plate 26 is not raised until the pan 11 is in substantially horizontal position as shown at Fig. 2. Material from the pan 10 is discharged by gravity onto the pan 11 across which some of the material passes rapidly and jumping the interval between such pan 11 and the chute 32 are carried by such chute to storage or other manipulating device. That material which was discharged upon the pan 11 having greater frictional resistance will not pass so rapidly across such pan and will, therefore, not acquire sufficient momentum to carry it across the intervening space and will, therefore, drop into the chute 33 and be carried to waste. Some of the materials which have the greater resistance will be maintained upon the pan 11 after the less resisting material has passed therefrom and when the several pans are tilted back to the position shown at Fig. 1 such material will also be discharged into the chute 33 as then the angle of the pan is greater than the angle of repose of any such materials. The pan 10 is also provided with a segmental baffle plate 34 which prevents the passage of material from the chute 25 when the pan 10 is tilted to the position shown at Fig. 2. Segmental blocks 35 are also carried by the side members 12 and 13 to prevent material upon the pan 10 from passing back as the pan 10 is wider than the chute 25.

The whole device is mounted in any approved manner as by the struts 36 and 37 and top plates 38 upon which the several parts are mounted in such obvious manner as to avoid the necessity of explanation.

We claim:

1. In a separating apparatus, pivoted pans, means to tilt one of said pans to substantially horizontal position to receive a load, means to tilt said pan to an inclined position to discharge said load and simultaneously to tilt the other pan to substantially horizontal position to offer frictional resistance to the passage of material thereover.

2. In a separating mechanism, adjacent pans the first of which is mounted to discharge upon the second, means to tilt the first pan to substantially horizontal position to receive a load, means to tilt the second pan to an inclined position to simultaneously discharge material therefrom, means to tilt the first pan to an inclined position to discharge material therefrom, and means to simultaneously tilt the second pan to horizontal position to offer frictional resistance to the passage of material thereover.

3. In a separating apparatus, a first pan positioned to discharge upon a second pan, a chute positioned to discharge material at times into the first pan, means carried by the first pan for regulating the amount of material received from the chute when the first pan is in horizontal position, means to tilt the first pan to an inclined position and to simultaneously release the material received from the chute and also simultaneously tilt the second pan to offer frictional resistance to the passage of material thereover.

4. In a separating apparatus, a first pan positioned to discharge upon a second pan, means to tilt said pans alternately from substantially horizontal to inclined positions, means to cause the discharge of material upon the first pan when in a horizontal position, and means to cause the discharge of material from said first mentioned pan onto said second pan when said second pan is in a horizontal position.

5. In a separating device, adjacent pans one of which is positioned to discharge upon the other when the first pan is in inclined and the second pan in horizontal position, a chute positioned to discharge upon the first pan when in a horizontal position, means carried by the first pan for maintaining the material received from the chute upon its front edge, means for automatically releasing the material when the first pan is tilted to an inclined position, a discharge chute spaced from the second pan in position to receive material passing thereover and bridging the space, and a second discharge chute positioned to receive material discharged from the second pan and which falls through said space.

6. In a separating device, adjacent pivoted pans, a walking-beam carried rigidly by the pivot of one pan, a crank-arm carried rigidly by the pivot of the other pan, means for applying oscillating motion to the walking-beam, and means for transmitting a part only of said oscillating movement from said walking-beam to said crank-arm.

7. In an apparatus of the class described, tilting adjacent pans, means to apply oscillating motion to one of said pans, means connecting said pan with the other of said pans adapted to permit a limited oscillating movement of the first mentioned pan without actuating the second pan and to oscillate said second mentioned pan with a less amplitude of movement.

8. In an apparatus of the class described, tilting adjacent pans, a chute adapted to discharge material upon one of said pans when in substantially horizontal position, means to tilt said pan to discharge upon the other pan, and means carried by the first mentioned pan to prevent the discharge of material from the chute when the first mentioned pan it tilted.

In testimony whereof we affix our signatures in presence of two witnesses.

FRED H. MASON.
THOMAS B. GRIFFIN.

Witnesses:
W. W. BAYLOR,
WALTER McCULLOCH.

Copies of this patent may be obtained for five cents each, by addressing the "Commissioner of Patents, Washington, D. C."